(12) United States Patent
Pawlaczyk et al.

(10) Patent No.: US 12,729,778 B2
(45) Date of Patent: Sep. 8, 2026

(54) HYDROSTATIC PRESSURE RELEASE APPARATUS FOR HYDROSTATIC TRANSMISSION

(71) Applicant: MTD PRODUCTS INC, Valley City, OH (US)

(72) Inventors: Noah Pawlaczyk, Valley City, OH (US); Adam Hiller, Jeromesville, OH (US); Michael Gretchko, North Ridgeville, OH (US)

(73) Assignee: MTD Products Inc, Valley City, OH (US)

( * ) Notice: Subject to any disclaimer, the term of this patent is extended or adjusted under 35 U.S.C. 154(b) by 166 days.

(21) Appl. No.: 18/820,693

(22) Filed: Aug. 30, 2024

(65) Prior Publication Data

US 2025/0075790 A1 Mar. 6, 2025

Related U.S. Application Data

(60) Provisional application No. 63/535,887, filed on Aug. 31, 2023.

(51) Int. Cl.
*F16H 61/4043* (2010.01)
*F16K 31/46* (2006.01)

(52) U.S. Cl.
CPC ......... *F16H 61/4043* (2013.01); *F16K 31/46* (2013.01)

(58) Field of Classification Search
CPC ............................. F16H 61/4043; F16K 31/46
See application file for complete search history.

(56) References Cited

U.S. PATENT DOCUMENTS 3,135,087 A * 6/1964 Ebert .................. F16H 61/4043 60/464
3,157,998 A * 11/1964 Harris ..................... F16H 39/10 91/506
3,213,621 A * 10/1965 Swift .................... F16H 61/423 60/444
7,028,708 B1 * 4/2006 Langenfeld ............. F16K 17/18 137/513.5
7,111,459 B1 9/2006 Brookens et al.
7,174,712 B1 2/2007 Brookens et al.
7,455,144 B2 * 11/2008 Ohashi .................... F16H 39/14 180/242
8,157,242 B2 * 4/2012 Parsons .................. F16K 35/02 251/129.11

(Continued)

*Primary Examiner* — Dustin T Nguyen
(74) *Attorney, Agent, or Firm* — Wegman Hessler

(57) ABSTRACT

Provided is a valve actuator comprising a release key defining an actuation axis, the release key having an engagement feature adapted for engagement with a bypass valve, a release mount defining a surface coaxial with the actuation axis, and a release key disposed within the release mount and interior adapted to rotate about the actuation axis, the release key having an engagement feature adapted for engagement with the bypass valve, a surface mated to the interior surface, a release key shoulder, a release key stem extending through the release mount, the release key stem having a flat; a spring engaged between the shoulder and the release mount; a release lever elongated to define a first axis and second axis, operationally engaged with the flat, and operable to apply torque to the release key; and a release rod engaged with the second lever axis.

12 Claims, 21 Drawing Sheets

(56) References Cited

U.S. PATENT DOCUMENTS

| | | | | |
|---|---|---|---|---|
| 8,205,641 | B2 * | 6/2012 | Richardson | F16K 31/5245 137/881 |
| 10,874,054 | B2 | 12/2020 | Krystowski et al. | |
| 11,547,051 | B2 * | 1/2023 | Yasuda | F16H 7/02 |
| 11,560,964 | B2 * | 1/2023 | Dahlgren | A61M 39/22 |

* cited by examiner

HYDROSTATIC PRESSURE RELEASE APPARATUS (BYPASS)
$100_R$
USA
$108_R$
$106_R$
$102_R$

HYDROSTATIC PRESSURE RELEASE APPARATUS (DRIVE)
$100_R$
USA
$108_R$
$106_R$
$102_R$

HYDROSTATIC PRESSURE RELEASE APPARATUS FOR HYDROSTATIC TRANSMISSION

CROSS-REFERENCE TO RELATED APPLICATIONS

This application claims the benefit of U.S. Provisional Application No. 63/535,887, filed Aug. 31, 2023.

ASSOCIATED INFORMATION

The disclosed subject matter generally pertains to apparatuses for a mower or other lawn or outdoor maintenance device having a hydrostatic transmission, and more specifically to a device to facilitate release of hydrostatic pressure in a hydrostatic transmission.

Manufacturers of power equipment for outdoor maintenance applications offer many types of machines for general maintenance and mowing applications. Generally, these machines can have a variety of forms depending on application, from general urban or suburban lawn maintenance, rural farm and field maintenance, to specialty applications.

Power equipment for outdoor maintenance applications has multiple options for power source and transmission. One common option of power transmission is a hydrostatic transmission.

It is sometimes desirable to move or rotate a component that is operationally engaged with the power output of a hydrostatic transmission. For example, and not by way of limitation, sometimes it is desirable to push a mower or tow it. In order to permit such movement or rotation a hydrostatic transmission is sometimes equipped with a bypass valve that can be adjusted between an activated position and a deactivated position. When a bypass valve is in the activated position flow of hydraulic fluid is diverted around the drive pump system (bypassing it) such that the components operationally engaged with power output of the hydrostatic transmission move independently of the hydrostatic transmission. In operation, this can be considered a neutral or freewheel position. Conversely, when a bypass valve is in the deactivated position flow of hydraulic fluid is directed through the drive pump system such that the components operationally engaged with power output of the hydrostatic transmission are linked therewith so as to move only as the hydrostatic transmission moves.

It remains desirable to develop apparatuses and methods to facilitate operational adjustment of a bypass valve in power equipment comprising a hydrostatic transmission

BRIEF SUMMARY

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

Various embodiments of the present disclosure relate to a valve actuator comprising a release key defining an actuation axis, the release key having an engagement feature adapted for engagement with a bypass valve, a release mount defining a surface coaxial with the actuation axis, and a release key disposed within the release mount and interior adapted to rotate about the actuation axis, the release key having an engagement feature adapted for engagement with the bypass valve, a surface mated to the interior surface, a release key shoulder, a release key stem extending through the release mount, the release key stem having a flat; a spring engaged between the shoulder and the release mount; a release lever elongated to define a first axis and second axis, operationally engaged with the flat, and operable to apply torque to the release key; and a release rod engaged with the second lever axis.

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

BRIEF DESCRIPTION OF THE DRAWINGS

FIG. 16A shows the assembly of FIG. 15 with the valve actuator in the bypass configuration.

Figure 1:
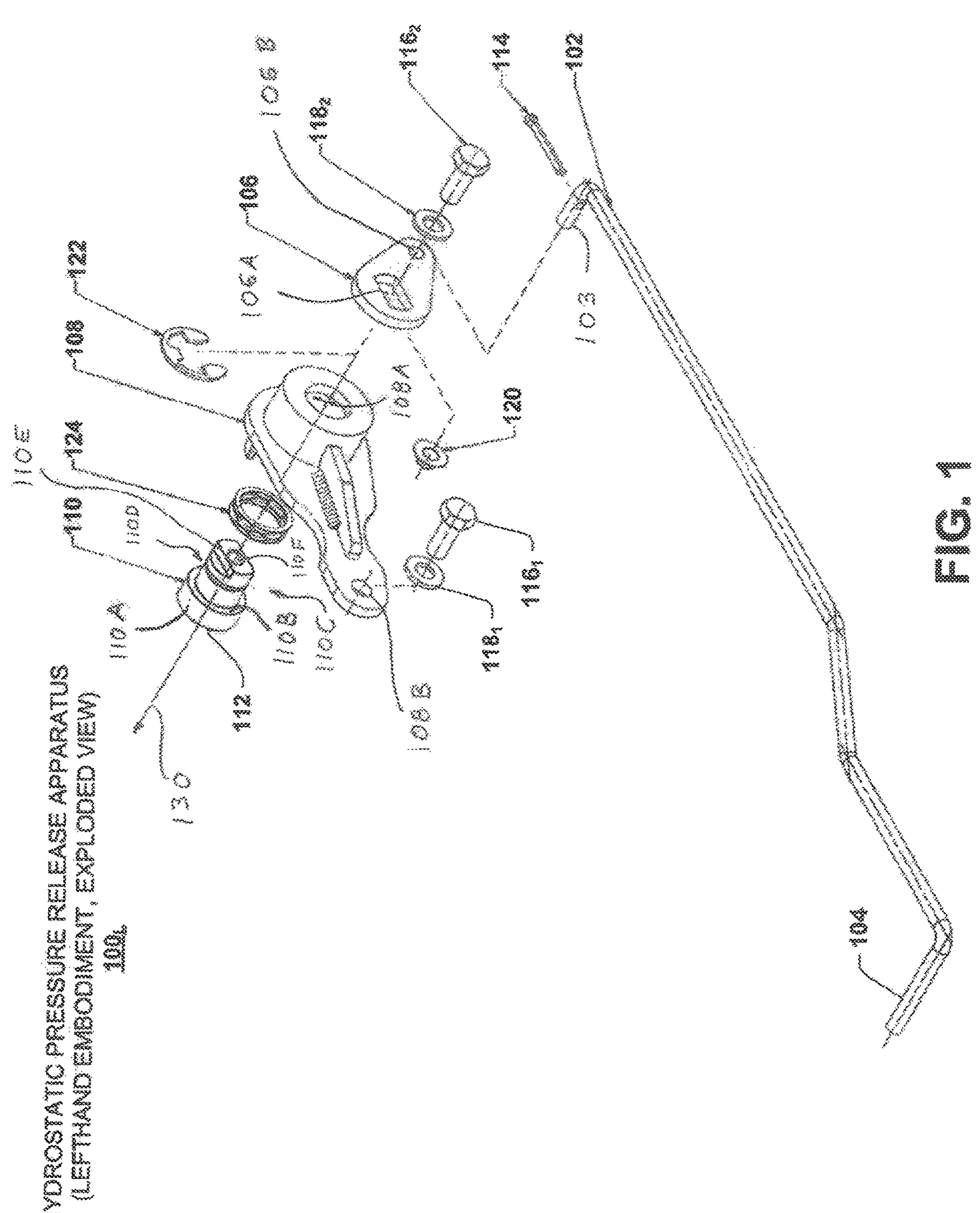
FIG. 1 shows an exploded view of a first embodiment of a valve actuator.
Figure 2:
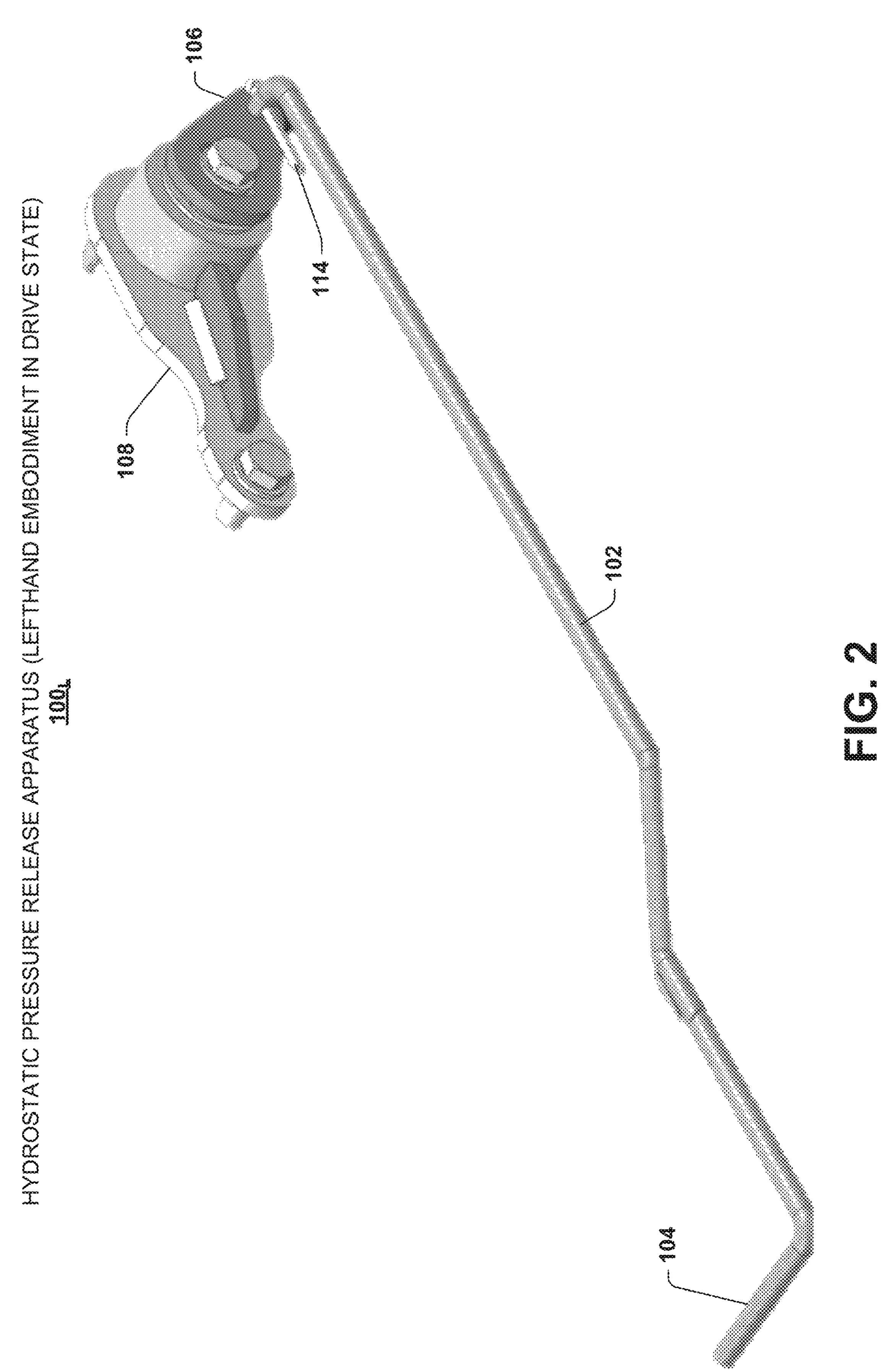
FIG. 2 shows a solid model of the first embodiment of a valve actuator.

It should be noted that the drawings are diagrammatic and not necessarily drawn to scale. Relative dimensions and proportions of parts of the figures have been shown exaggerated or reduced in size for the sake of clarity and convenience in the drawings. The same reference numbers are generally used to refer to corresponding or similar features in the different embodiments, except where clear from context that same reference numbers refer to disparate features. Accordingly, the drawings and description are to be regarded as illustrative in nature and not as restrictive.

While embodiments of the disclosure pertaining to hydrostatic pressure release apparatus for hydrostatic transmission are described herein, it should be understood that the disclosed machines, devices and methods are not so limited and modifications may be made without departing from the scope of the present disclosure. The scope of the systems, methods, and devices for hydrostatic pressure release apparatus for hydrostatic transmission are defined by the appended claims, and all devices, processes, and methods that come within the meaning of the claims, either literally or by equivalence, are intended to be embraced therein.

DETAILED DESCRIPTION

Various embodiments of power equipment use hydrostatic transmissions for a variety of applications. The uses include, but are not limited to hydrostatic transmission used as a primary power output in drive systems in lawn maintenance apparatuses. As used herein, the lawn maintenance apparatus can be referred to as a "mower", but it should be understood that the lawn maintenance apparatus is one example and the technology herein can relate to any suitable power equipment.

The following paragraphs generally reference drawing FIGS. 1-21. In some figures, features are referenced by a number with a subscript L or a subscript R, referencing a kind of component referred to by the number as used on the left hand side of a depicted assembly or the right hand side of a depicted assembly, respectively. In general, the descriptions below will refer to the component by number without the subscript.

FIG. 1 shows an exploded view of a first embodiment of a valve actuator 100 adapted to operationally engaged to a hydrostatic transmission 10 to facilitate operational adjustment of the bypass valve thereof between a drive position and a bypass position. The valve actuator 100 comprises a release key 110 having an engagement feature 112 adapted for operation engagement with a bypass valve actuator of a hydrostatic transmission. The release key 110 is rotatably retained in a release mount 108. The release mount defines a housing for the release key that fixes the release key 110 in position with respect to the bypass valve actuator but permits the release key 110 to rotate about actuation axis 130. In the embodiment shown in FIG. 1, the release key 110 has a cylindrical exterior surface 110A that is adapted to operationally mate up to and be held partially within a coaxial (along actuation axis 130) cylindrical interior surface 108A of the release mount 108.

The release key 110 is also axially positioned by the release mount 108 to hold it in engagement with the bypass valve actuator of a hydrostatic transmission. In the embodiment shown in FIG. 1, a spring 124 is positioned between the release key 110 and the release mount 108 such that, when assembled the spring 124 is compressed and applies a load to release key 110 to push it toward, and into contact with, the bypass valve actuator. In some embodiments, spring 124 may comprise a Belleville washer, a coil spring, an elastomeric bushing, or other component chosen with good engineering judgment. In some embodiments, the release key 110 may comprise a release key shoulder 110B adapted to receive the load from the spring 124. Similarly, release mount 108 may comprise a surface to receive the load from the spring 124.

The release key 110 may be elongated to extend through the release mount 108. In some embodiments an elongated portion of the release key 110 is a release key stem 110C which is adapted to extend through the release mount 108 when properly assembled therewith.

In some embodiments the release key stem 110C may comprise a connection feature 110D which is adapted to receive a mechanical faster adapted to secure the release key 110 within the release mount 108. In the embodiment shown in FIG. 1, the connection feature 110D is a groove adapted to receive a retaining ring 122 such as an E-clip but this is not limiting, and other connection features adapted for use with other mechanical fasters is contemplated.

In some embodiments the release key 110 may comprise geometry to facilitate the application of operational torque to the release key 110. Operational torque is torque sufficient to rotate release key 110 and an operationally engaged bypass valve actuator about actuation axis 130. In the embodiment shown in FIG. 1, the geometry to facilitate the application of torque to the release key 110 is flat 110E. Flat 110E is adapted to operationally engaged with release lever 106 such that release lever 106 can apply the operational torque to the release key 110. This latter described engagement is not limiting and it is contemplated that there are other acceptable means for engagement between the release key 110 and the release lever 106 which may include but are not limited to spline engagement, engagement via a set of key ways and a key, welding, or other means chosen with good engineering judgment.

In some embodiments, the release key 110 may comprise a feature to retain the release lever 106. In the embodiment shown in in FIG. 1, the latter feature to retain the release lever 106 is hole 110F. Hole 110F is a female threaded hole adapted to threadedly engage bolt 1162. Inclusion of a washer 1182 as part of the assembly of the bolt 1162 to hole 110F is optional.

In the embodiment shown in FIG. 1, as assembled, release key stem 110C extends through release mount 108 to expose connection feature 110D to which retaining ring 122 is engaged to retain the release key 110 within the release mount 108. Further, the release key stem 110C extends through release mount 108 to expose flat 110E to which release lever 106 is operationally engaged. Once release lever 106 is operationally engaged to flat 110E, bolt 1162 is threadedly engaged to hole 110F to retain the release lever 106 in place.

The release mount 108 may comprise features to facilitate engagement to a hydrostatic transmission. In the embodiment shown in FIG. 1, the release mount comprises a through hole 108B adapted to accept a mechanical faster such as a bolt. In the non-limiting embodiment shown in FIG. 1, and with additional reference to FIG. 13, the hole 108B is positioned to align with an existing female threaded bolt hole, anchor point 16, in the housing of the hydrostatic transmission such that the release mount 108 may be positioned such that the cylindrical interior surface 108A is coaxial with actuation axis 130 and such that the hole 108B is engagably aligned with the existing female threaded bolt hole, anchor point 16, and a bolt 1161 may be threadedly engaged therebetween with or without an optional washer 1181. This latter described engagement is not limiting and it is contemplated that there are other acceptable means for engagement between the release mount 108 and the hydrostatic transmission. For example, and not by way of limitation, a secondary component with a female threaded bolt hole adapted to be engagably aligned with hole 108B may be engaged to the hydrostatic transmission by welding, bolting, or other means chosen with good engineering judgment. Alternatively, the release mount 108 may be engaged to the hydrostatic transmission by welding, or other means chosen with good engineering judgment.

Figure 13:
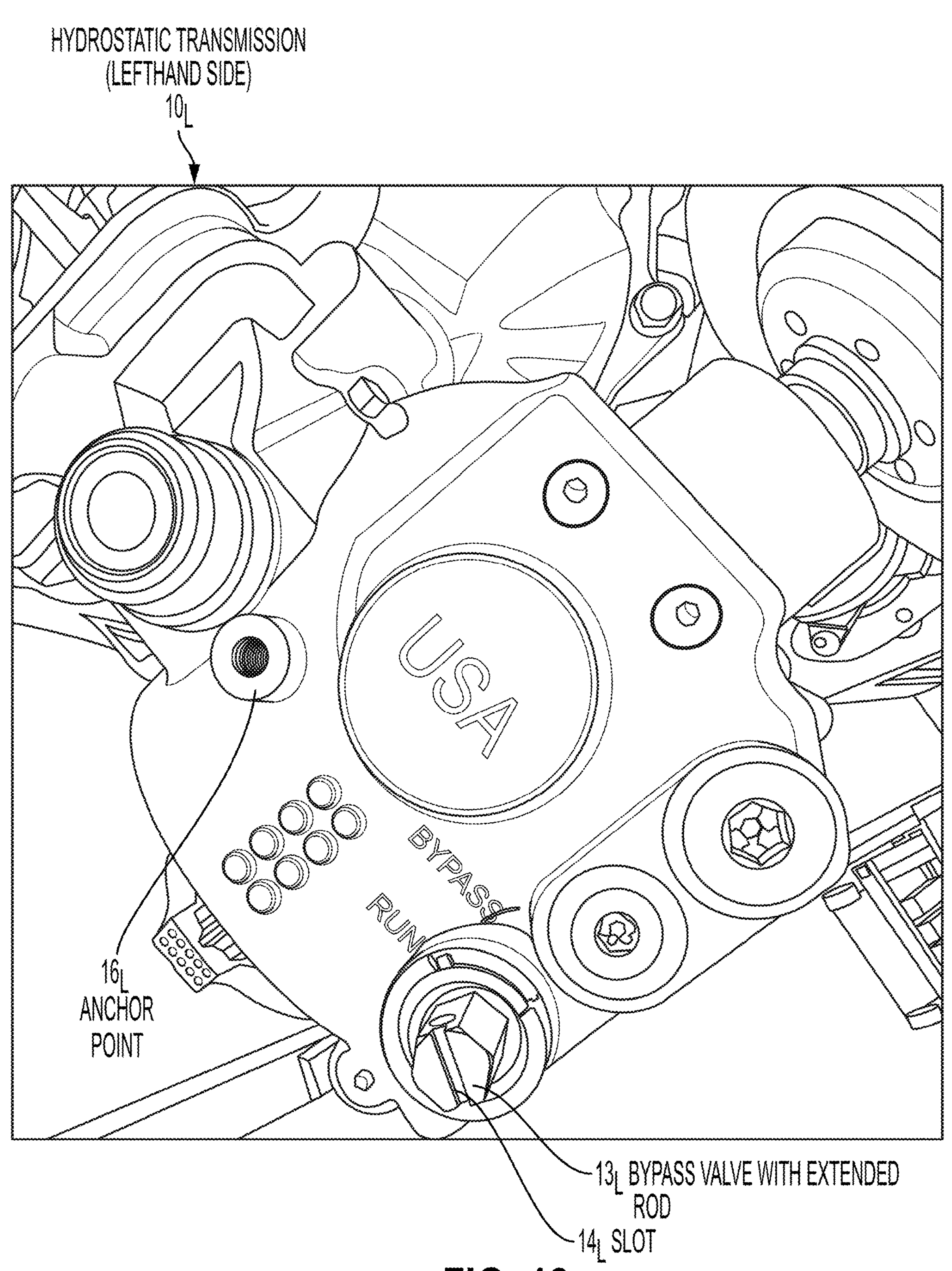
FIG. 13 shows a close up of one embodiment of a bypass valve for the first embodiment of a hydrostatic transmission.
Figure 20:
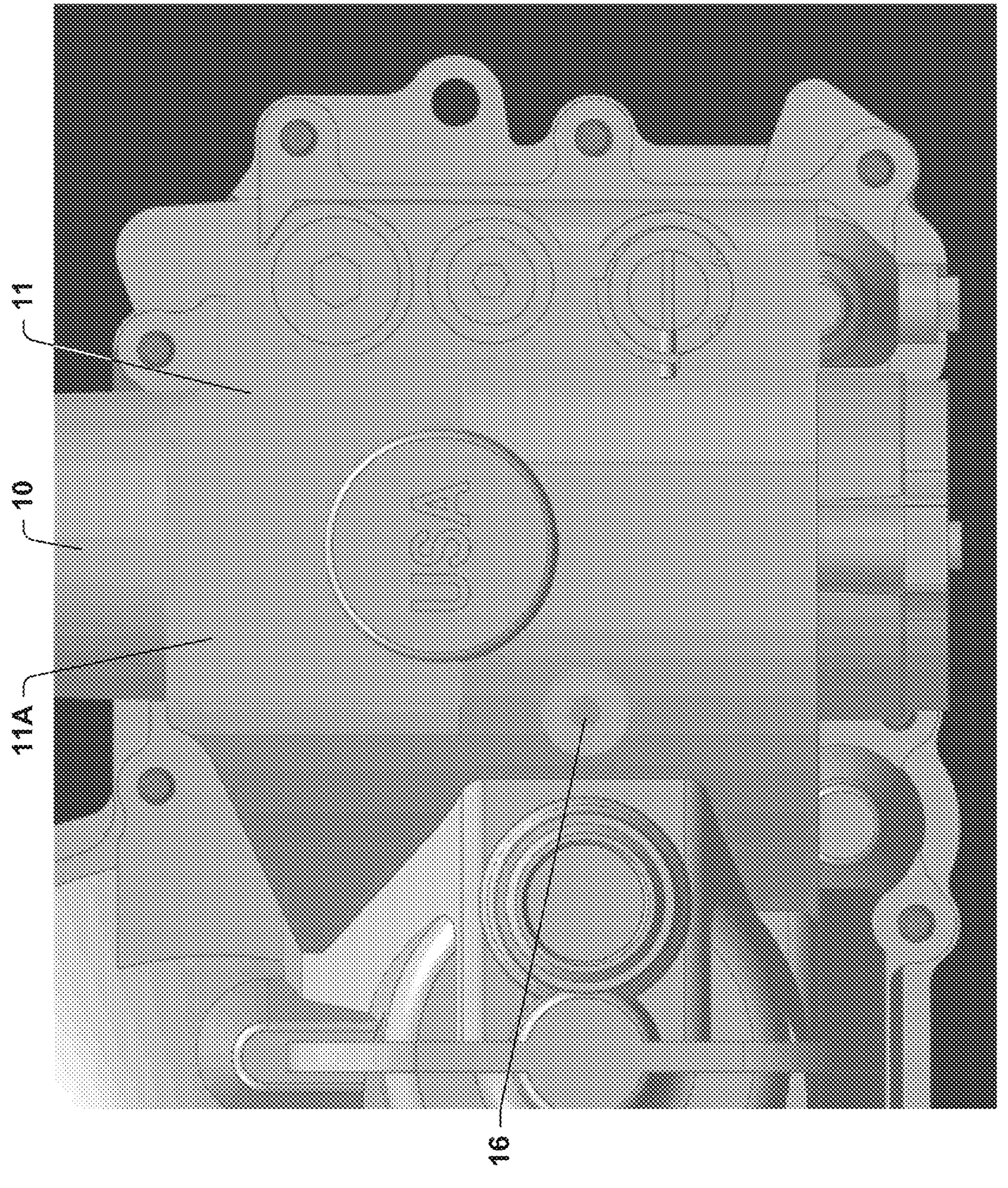
FIG. 20 shows a side view of one embodiment of a hydrostatic transmission.
Figure 21:
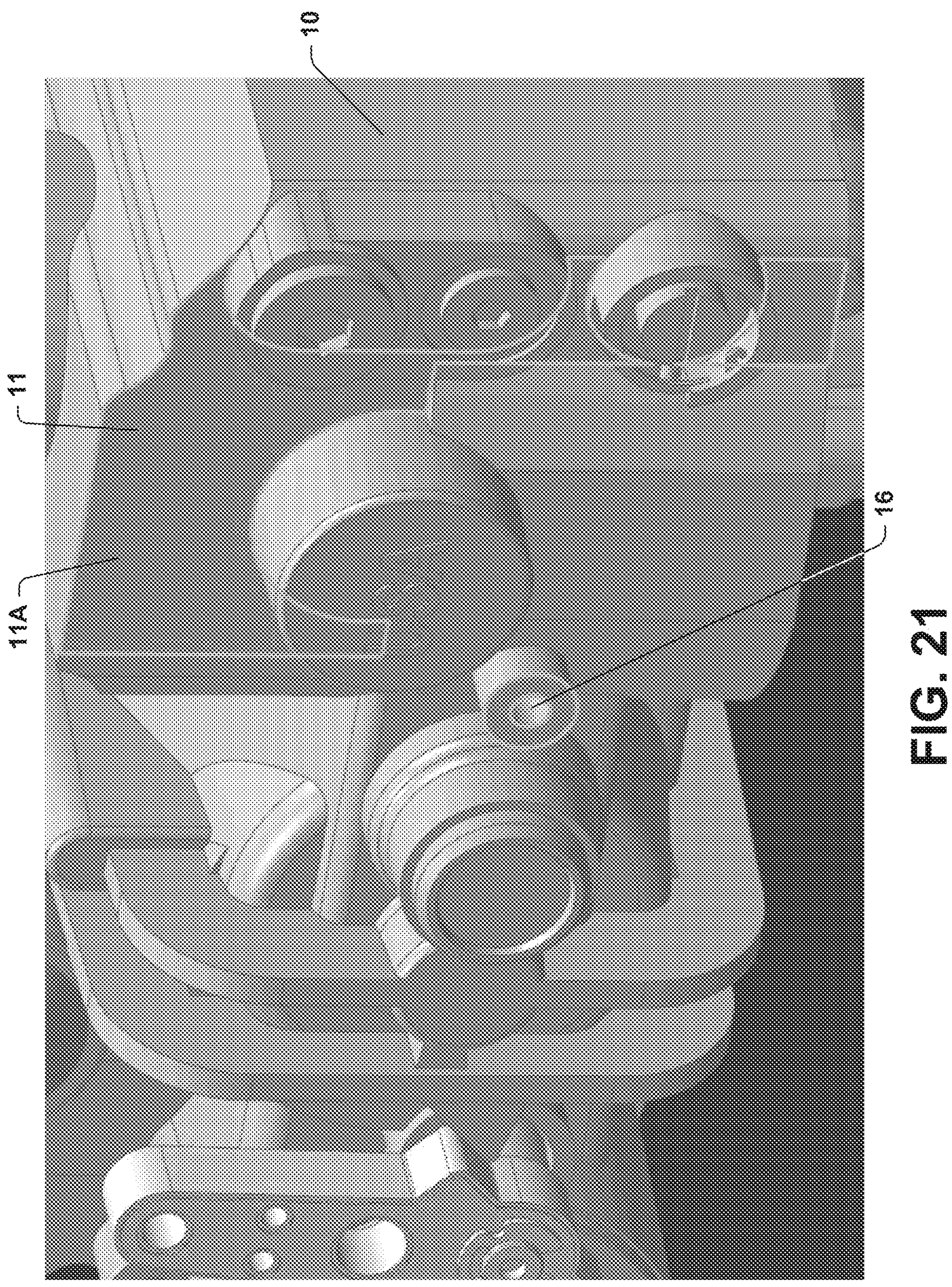
FIG. 21 shows a side view of the embodiment of a hydrostatic transmission from FIG. 20.

With continued reference to FIG. 1 and with additional reference to FIGS. 13, 20 and 21, in some non-limiting embodiments the release mount 108 may be adapted to locate directly on the casting of the hydrostatic transmission 10 with which it is operationally engaged. One such non-limiting casting is shown in FIGS. 20 and 21 where transmission surface 11 comprises one or more planar regions 11A to which the release mount 108 may be secured. As shown in FIGS. 20 and 21, the planar regions 11A of transmission surface 11 may include anchor point 16. Locating the release mount 108 directly on the casting of the hydrostatic transmission 10 with which it is operationally engaged and using an existing anchor point 16 provides a means to operationally engage the valve actuator 100 that may be substantially more reliable or inexpensive than alternative means.

Figure 15:
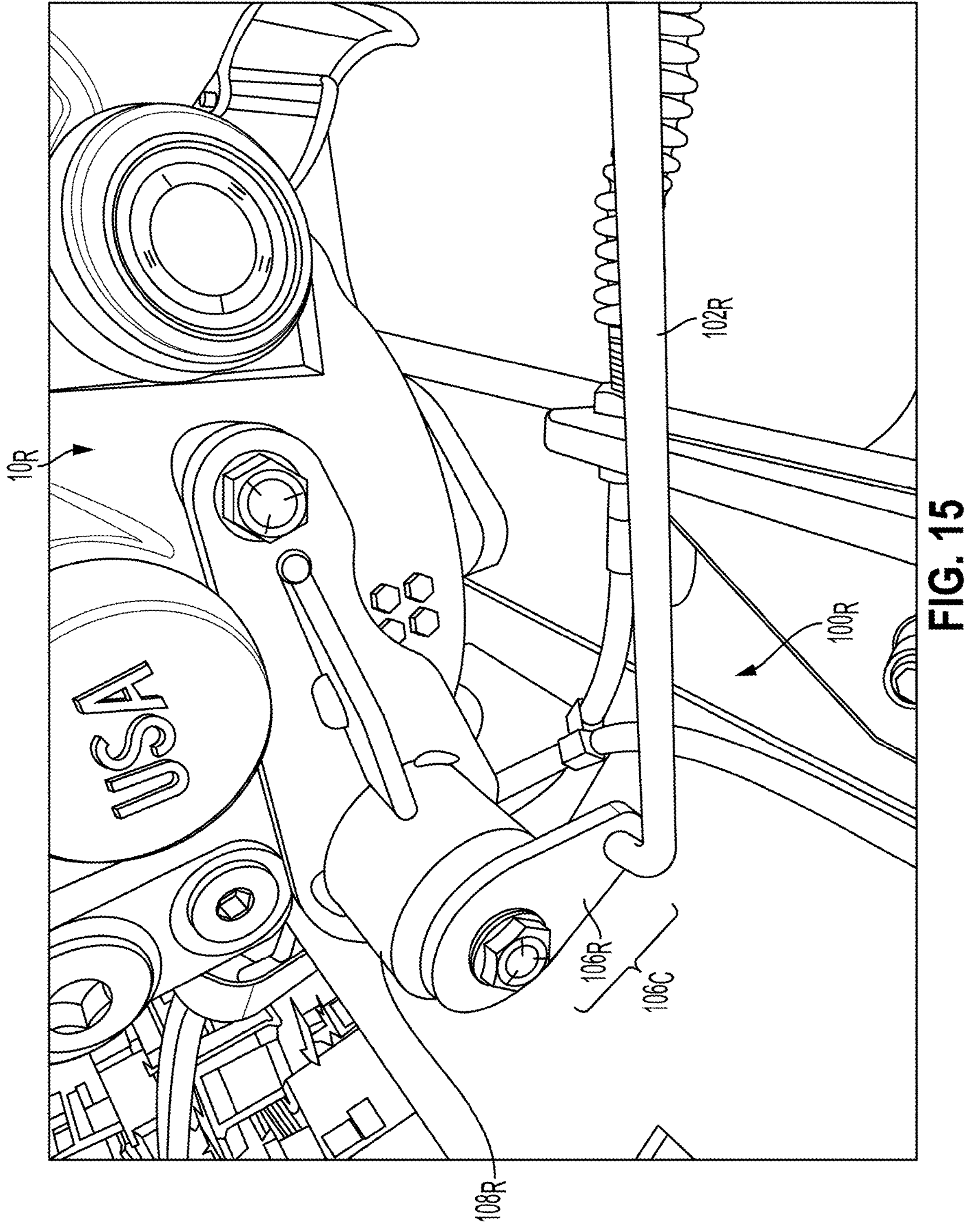
FIG. 15 shows a close up of an assembly of the second embodiment of a hydrostatic transmission with the second embodiment of the valve actuator.
Figures 16A, 16B:
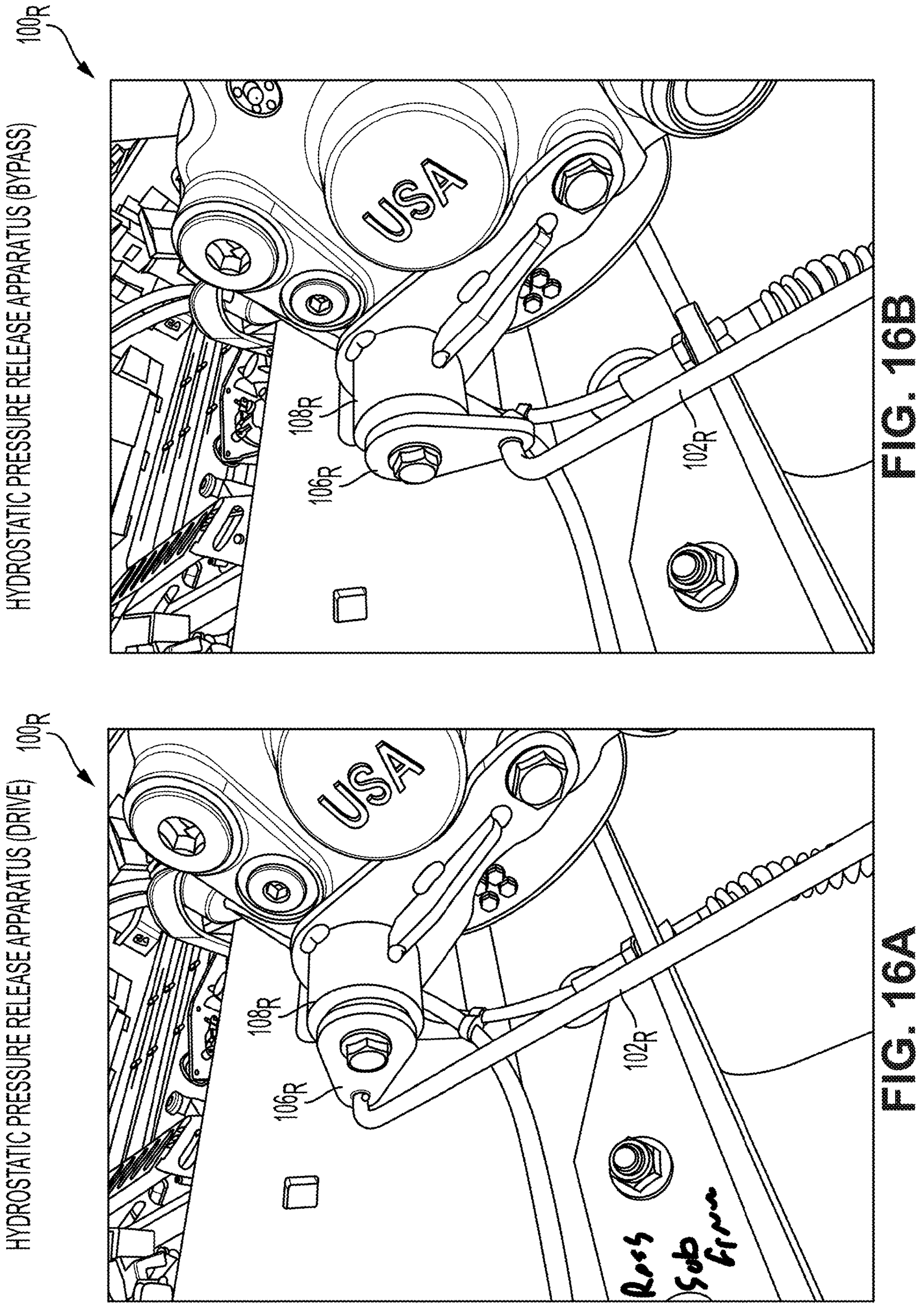
FIG. 16A shows the assembly of FIG. 15 with the valve actuator in the drive configuration.

With continued reference to FIG. 1 and with additional reference to FIG. 15, release lever 106 is elongated to define a first lever axis 106A and second lever axis 106B parallel to and offset from the first lever axis 106A by a release lever operational length 106C. In the assembly shown in FIGS. 1 and 2, release lever is positioned such that the first lever axis 106A is coaxial with the actuation axis 130 and release lever 106 is operationally engaged with the flat 110E such that it is operable to apply operational torque to the release key 110. In the non-limiting embodiment shown in FIG. 1, first lever axis 106A is defined by a flattened through hole adapted to mate up to flat 110E, but other alternatives chosen with good engineering judgment are acceptable. In the non-limiting embodiment shown in FIG. 1, second lever axis 106B is defined by a through hole adapted to accept release rod 102 therethrough, but other alternatives chosen with good engineering judgment are acceptable.

With continued reference to FIG. 1, valve actuator 100 further comprises a release rod 102. Release rod 102 is adapted to apply a force to the release lever 106 at the second lever axis 106B sufficient to rotate the release lever 106 about the first lever axis 106A and thereby to move the operationally engaged bypass valve actuator between drive and bypass positions. As shown in FIG. 1, the release rod 102 may be elongated with a release handle 104 at one end and a lever engagement feature 103 at the other end. The release handle 104 is adapted to be pushed or pulled by a user by hand or by using a tool. The lever engagement feature 103 is operationally engaged with the release lever 106 at the second lever axis 106B. In the non-limiting embodiment shown in FIG. 1, the lever engagement feature 103 passes through the through hole which defines second lever axis 106B. The lever engagement feature 103 may be constrained to remain within the through hole which defines second lever axis 106B. As shown in FIG. 1, the lever engagement feature 103 is constrained on one side of the release lever 106 by a cap fitting 120 and on the other side of the release lever 106 by a cotter pin 114. These latter means of engagement of the lever engagement feature 103 and means of constraining it to remain within the through hole are not limiting and other means chosen with good engineering judgment are also acceptable.

Figure 3:
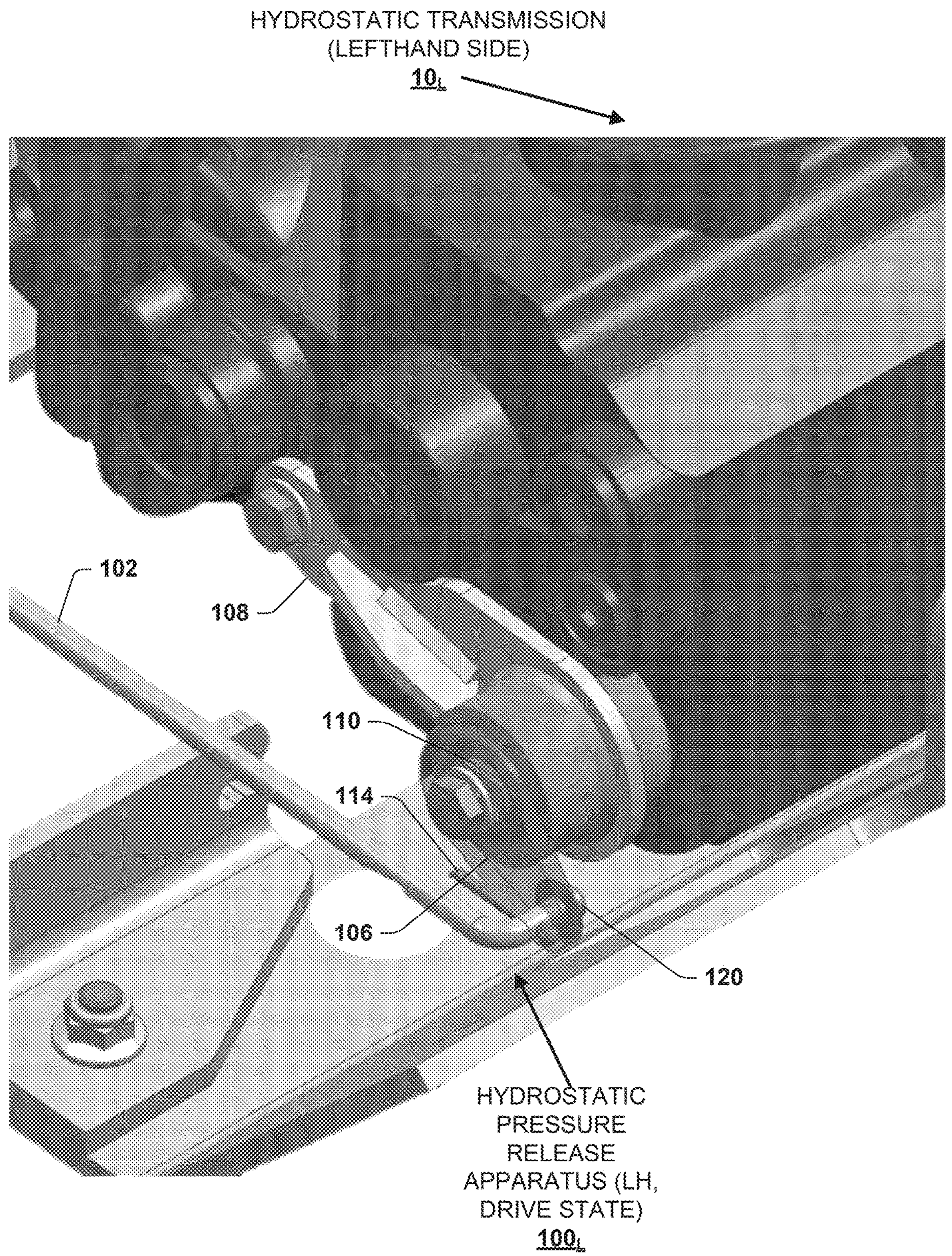
FIG. 3 shows a close up of a solid model of the first embodiment of a valve actuator in a drive configuration as engaged with a hydrostatic transmission.

Referring to FIG. 3, valve actuator 100 is shown assembled to a hydrostatic transmission 10. The assembly in FIG. 3 is a left hand side assembly in the drive state.

Figure 4:
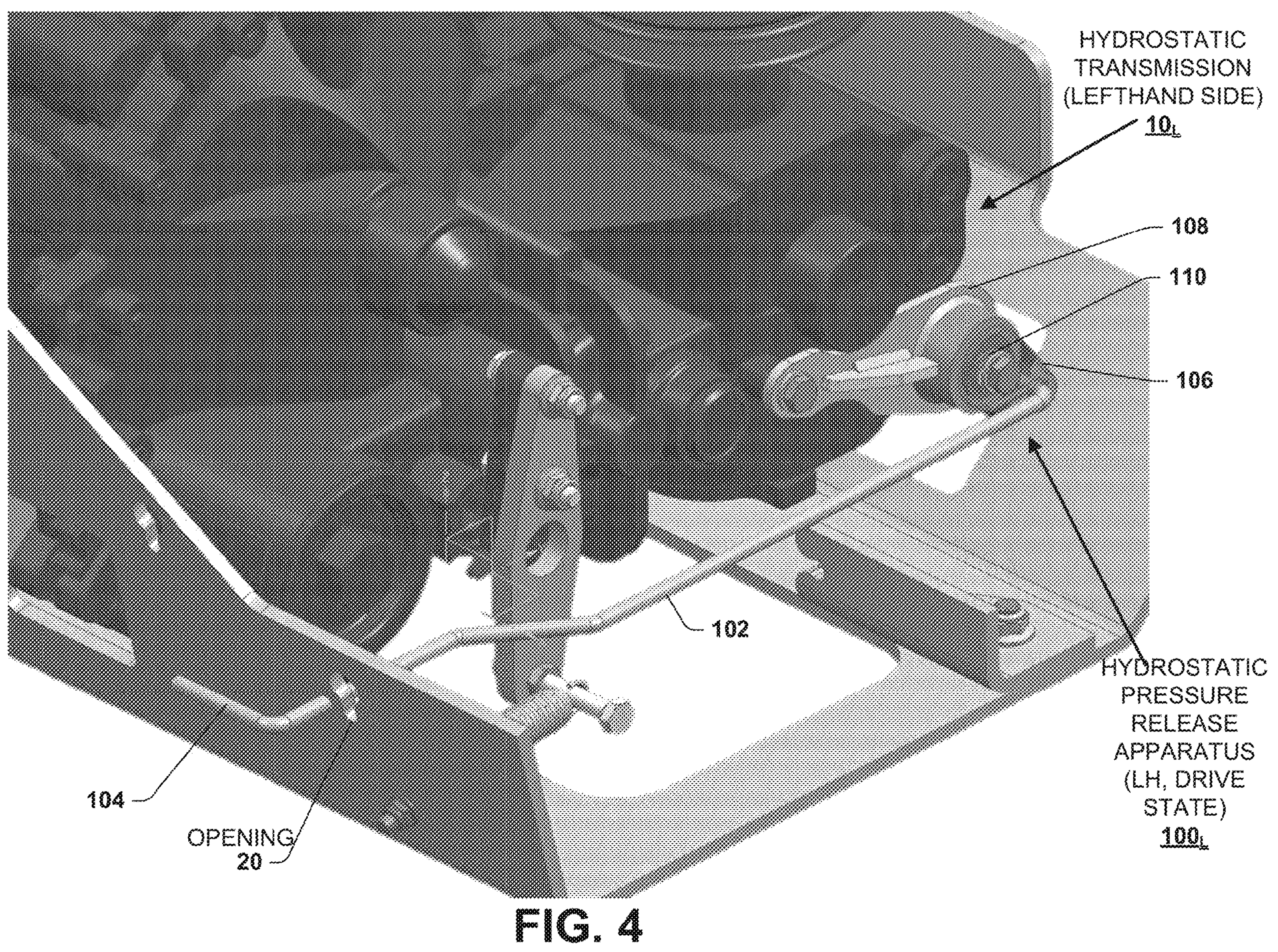
FIG. 4 shows a solid model of the first embodiment of a valve actuator in a drive configuration as engaged with a hydrostatic transmission.
Figure 5:
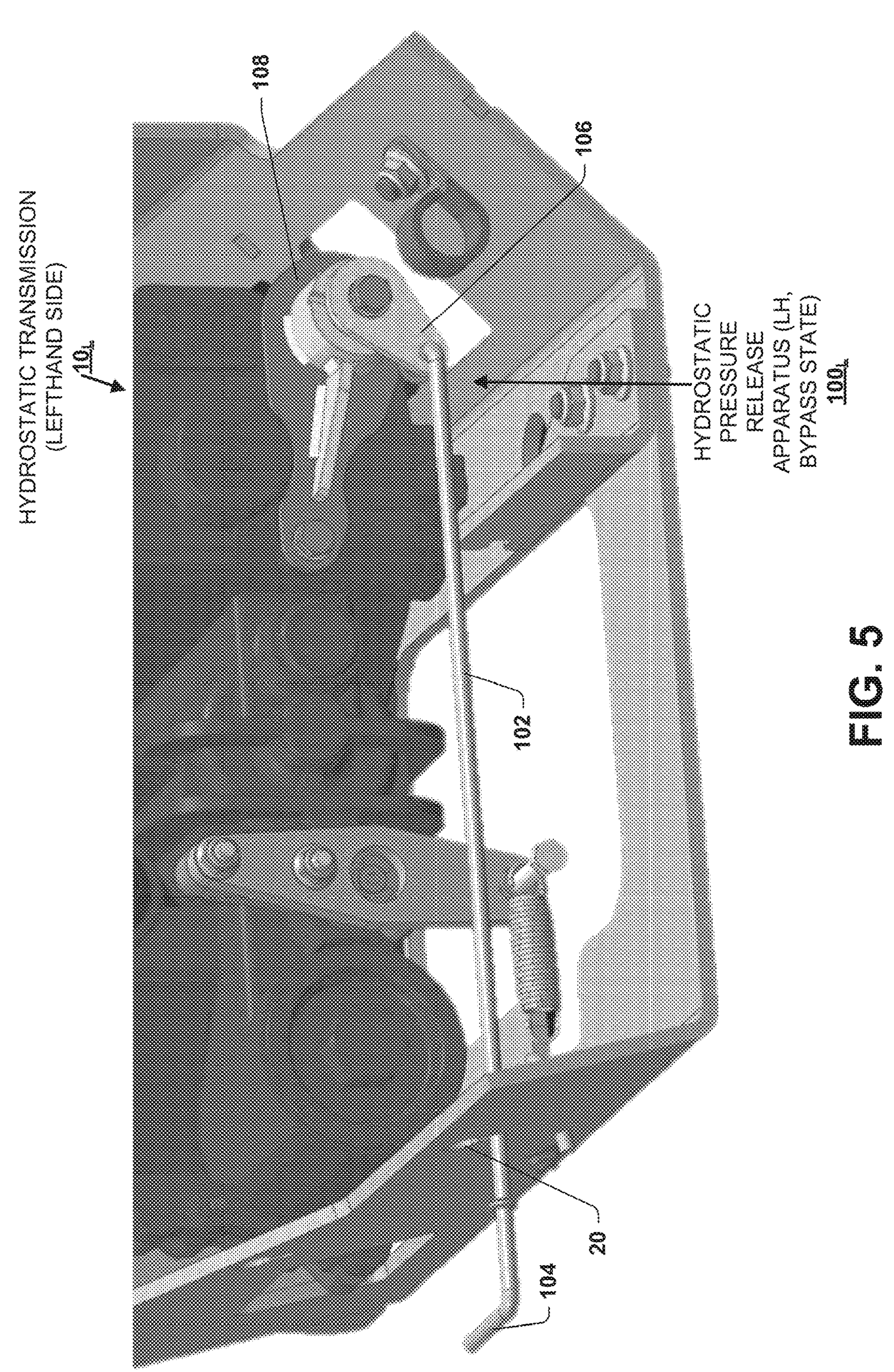
FIG. 5 shows a solid model of the first embodiment of a valve actuator in a bypass configuration as engaged with a hydrostatic transmission.

Referring to FIGS. 4 and 5, valve actuator 100 is shown assembled to a hydrostatic transmission 10 mounted within a structure 15 (See FIG. 6) with an opening 20 therein through which extends the release rod 102 such that the release handle 104 is on the outside of the structure 15. The assembly in FIG. 4 is a left hand side assembly in the drive state. FIG. 5 shows the same assembly as that of FIG. 4, but in the bypass state. Note that in FIG. 5, the release lever has been moved (approximately 90 degrees clockwise) relative to the orientation shown in FIG. 4.

Figure 6:
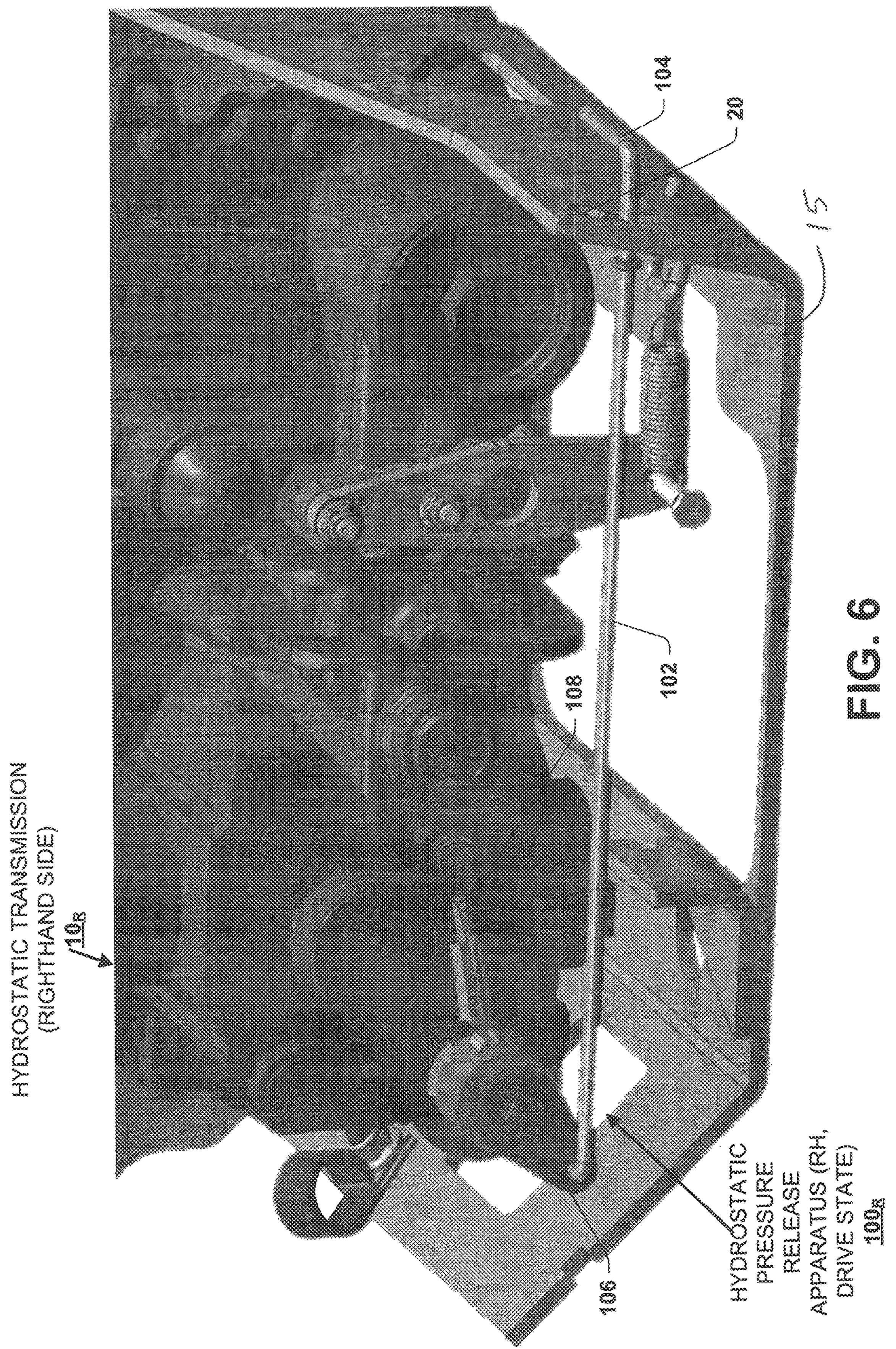
FIG. 6 shows a solid model of a second embodiment of a valve actuator in a drive configuration as engaged with a hydrostatic transmission.
Figure 7:
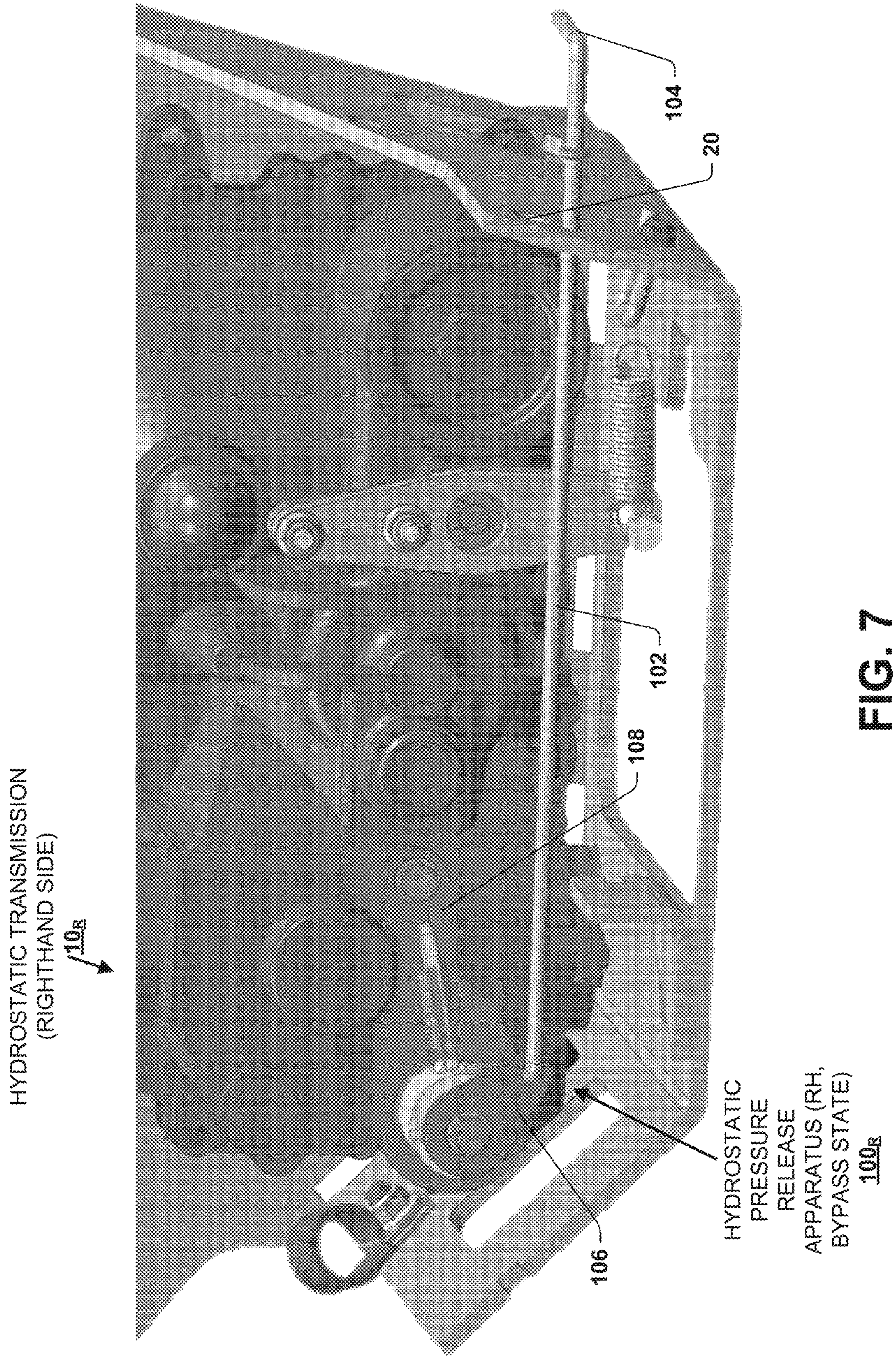
FIG. 7 shows a solid model of a second embodiment of a valve actuator in a bypass configuration as engaged with a hydrostatic transmission.

Referring to FIGS. 6 and 7, valve actuator 100 is shown assembled to a hydrostatic transmission 10 mounted within a structure 15 with an opening 20 therein through which extends the release rod 102 such that the release handle 104 is on the outside of the structure 15. The assembly in FIG. 6 is a right hand side assembly in the drive state. (cf. FIG. 4, referenced above.) The assembly in FIG. 7 shows the same assembly as that of FIG. 6, but in the bypass state. Note that in FIG. 7, the release lever has been moved (approximately 90 degrees counter-clockwise) relative to the orientation shown in FIG. 6. (cf. FIGS. 15, 16A and 16B.)

Figure 8:
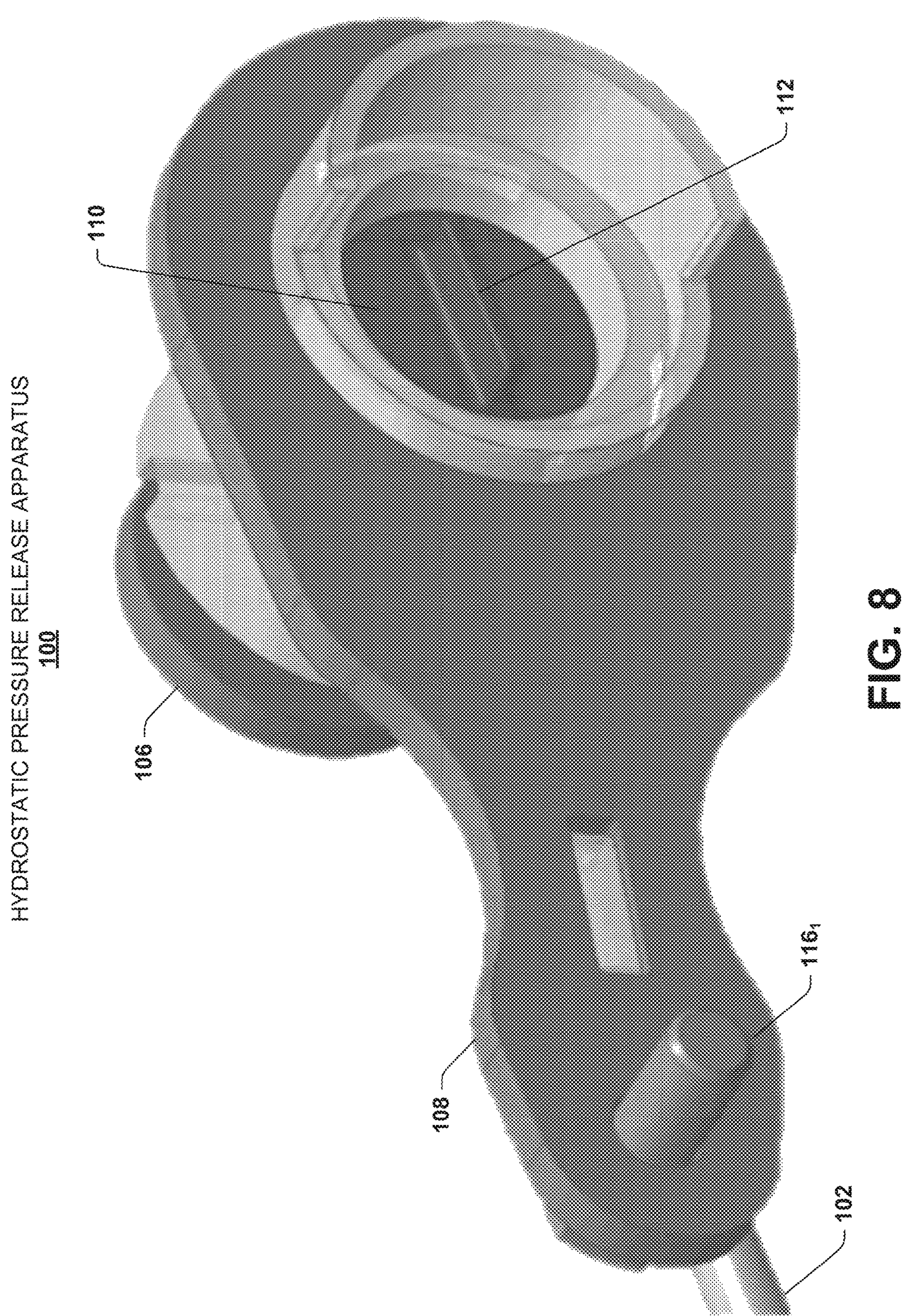
FIG. 8 shows a close up solid model of the second embodiment of a valve actuator.
Figures 11A, 11B:
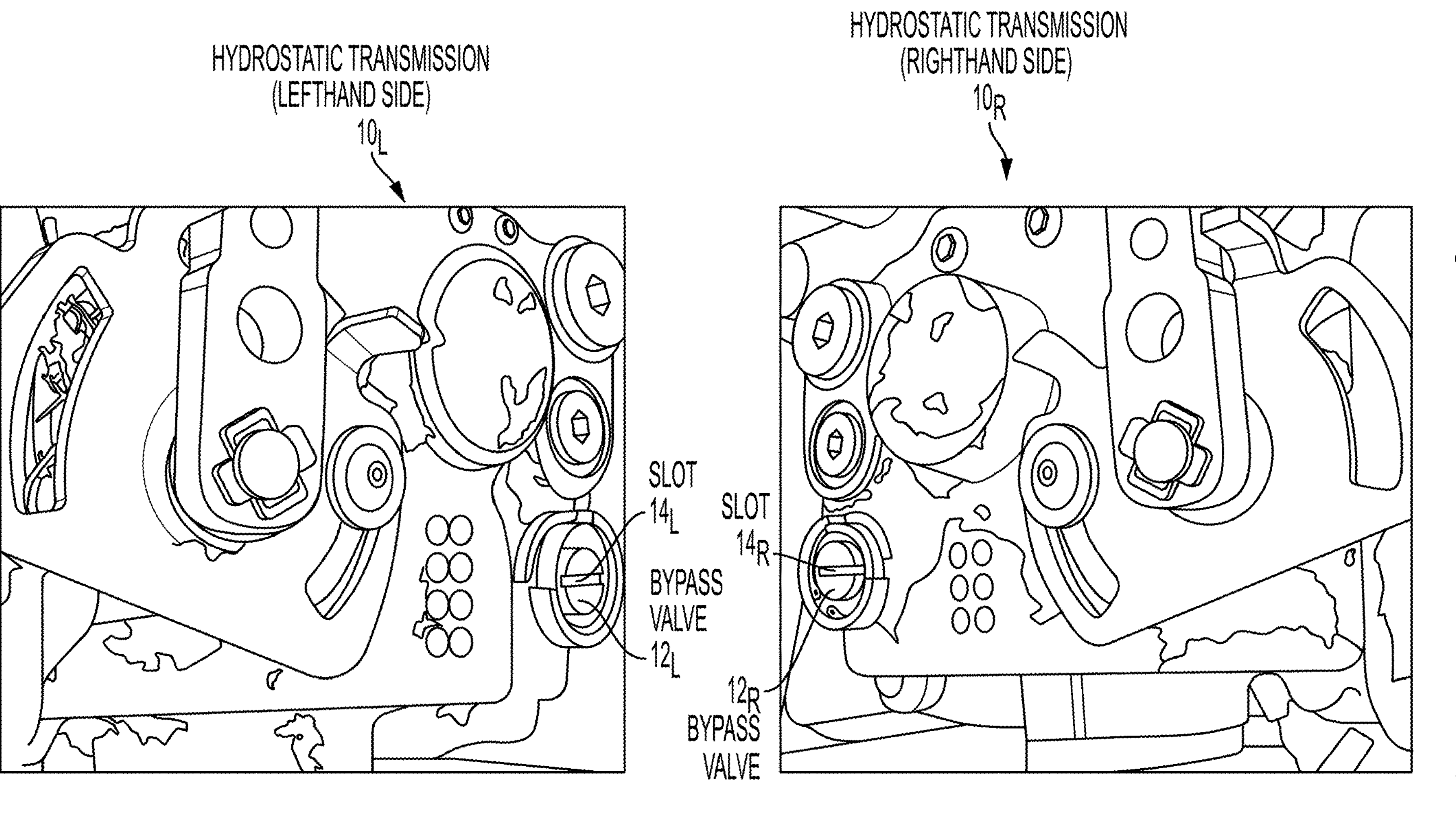
FIG. 11A shows a first embodiment of a hydrostatic transmission.
FIG. 11B shows a second embodiment of a hydrostatic transmission.
Figure 12:
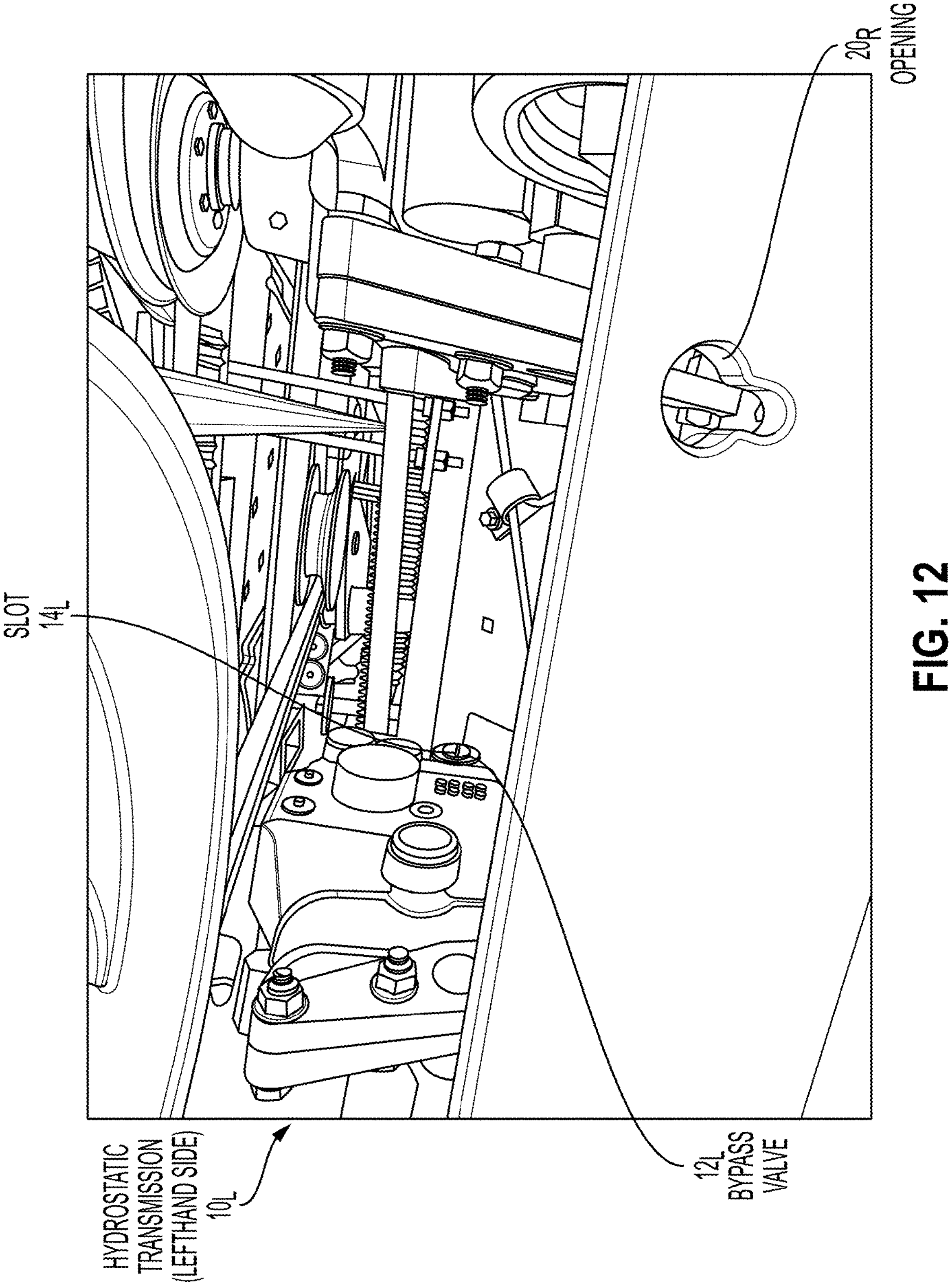
FIG. 12 shows a rear view of a power equipment apparatus comprising the first embodiment of a hydrostatic transmission.

Referring to FIG. 8, and with additional reference to FIGS. 11A and 11B, a close up of a right hand version of valve actuator 100 is shown. It should be noted that the engagement feature shown in FIG. 8 is a straight bar which emulates the tool bit of a standard (aka flat) screwdriver adapted to operationally engage the slot 14 in the bypass valve 12. This latter embodiment is not limiting: the engagement feature can be any form adapted to operationally engage the corresponding engagement feature of the bypass valve of an associated hydrostatic transmission. For example, and not limitation, were the bypass valve of an associated hydrostatic transmission formed to be a hexagonal head adapted to operationally engage a hexagonal socket, the engagement feature would emulate an appropriately sized hexagonal socket. It should be understood that the bypass valve and the engagement feature may be of a form that emulates any fastener and compatible tool bit including tamper resistant or proprietary fasteners and tools. With further reference now to FIG. 13, shown is an alternative embodiment of the bypass valve 13 which presents two different and equally operative engagement features: 1) a slot and 2) a hexagonal head. The engagement feature of a valve actuator 100 adapted for operational engagement with bypass valve 13 could then be a straight bar, an appropriately sized hexagonal socket, or both.

Figure 9:
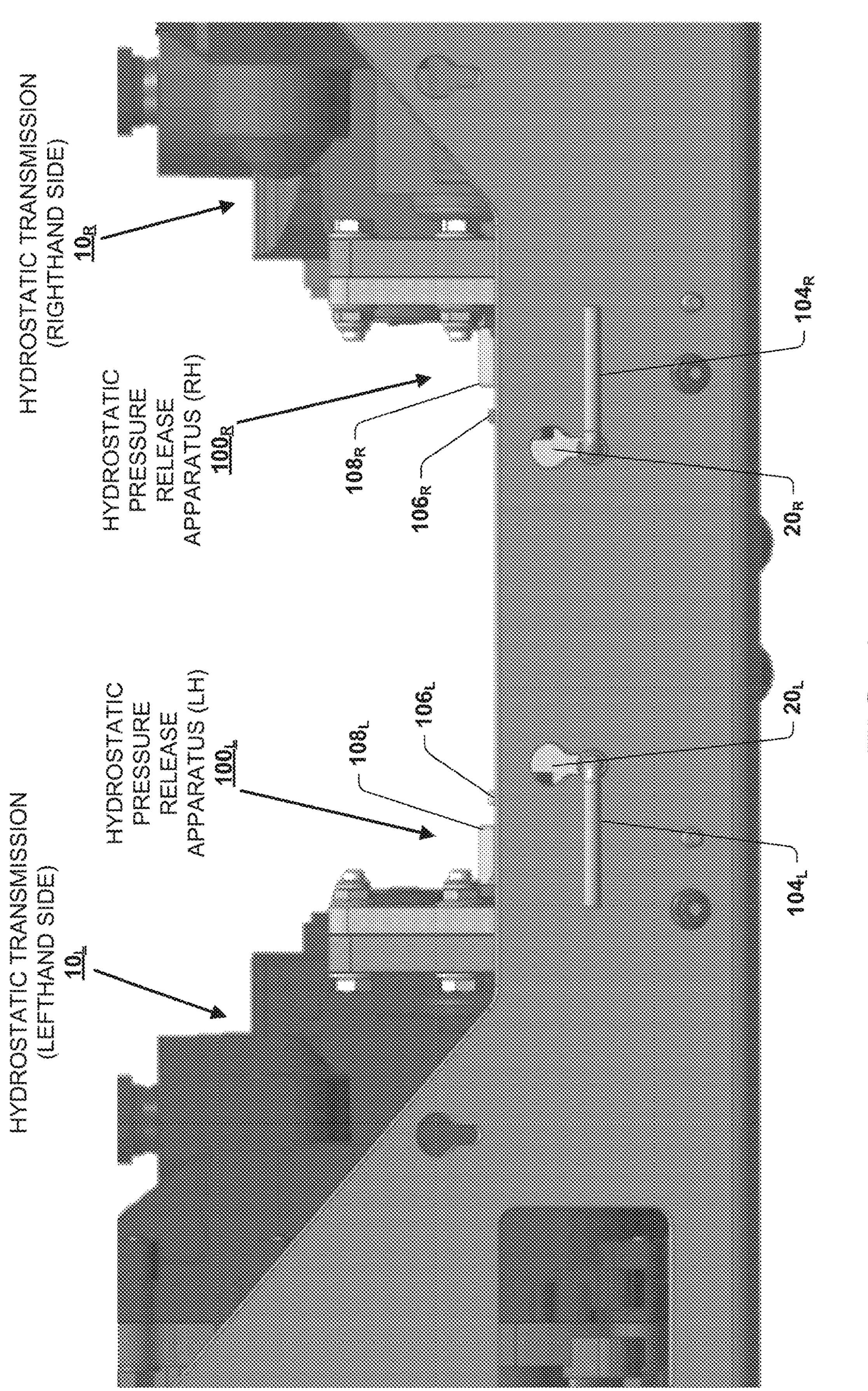
FIG. 9 shows a rear view of a power equipment apparatus comprising the first embodiment of the valve actuator and the second embodiment of the valve actuator.
Figure 10:
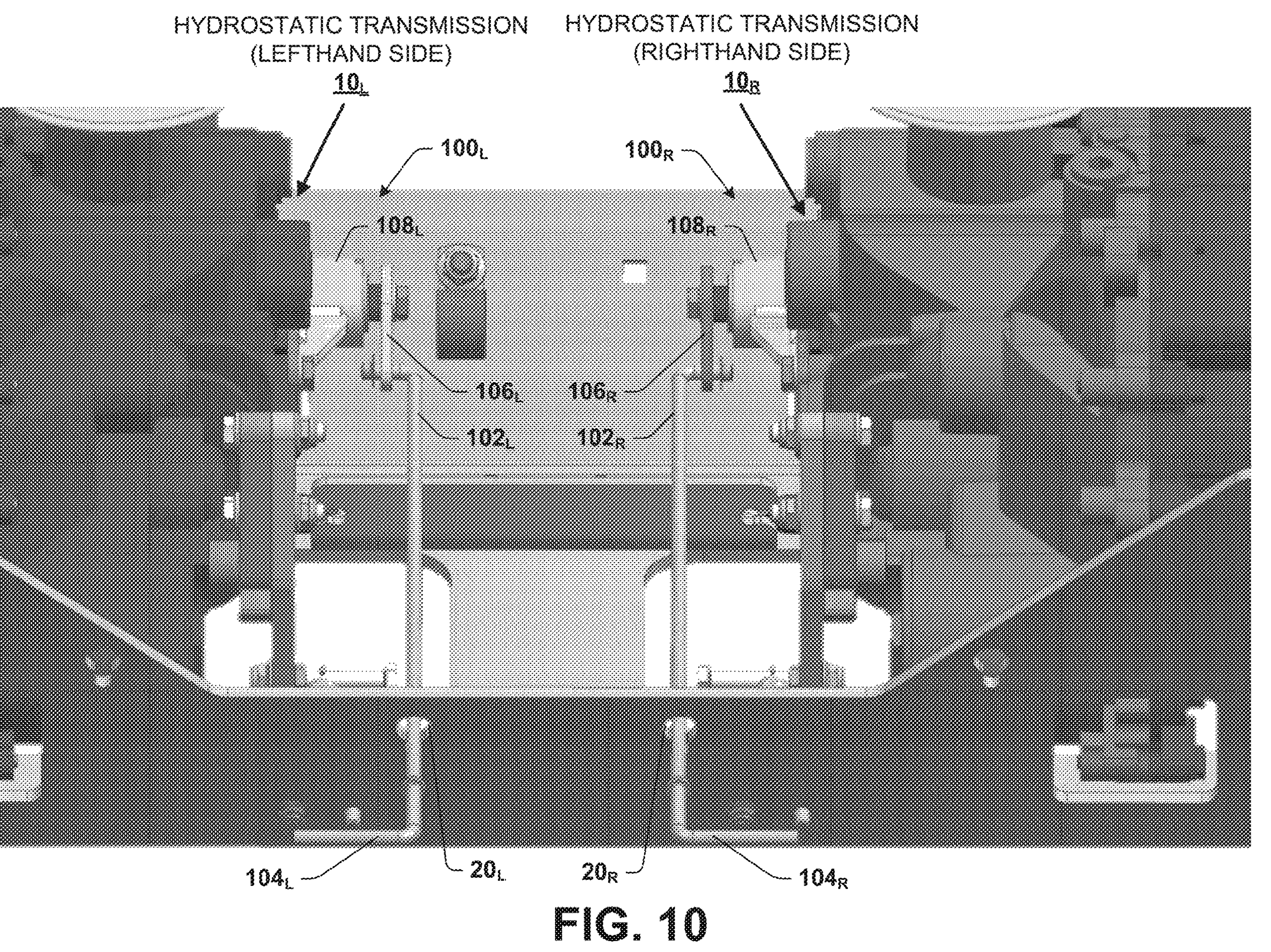
FIG. 10 shows a top perspective view of the power equipment apparatus of FIG. 9 comprising the first embodiment of the valve actuator and the second embodiment of the valve actuator.
Figure 14:
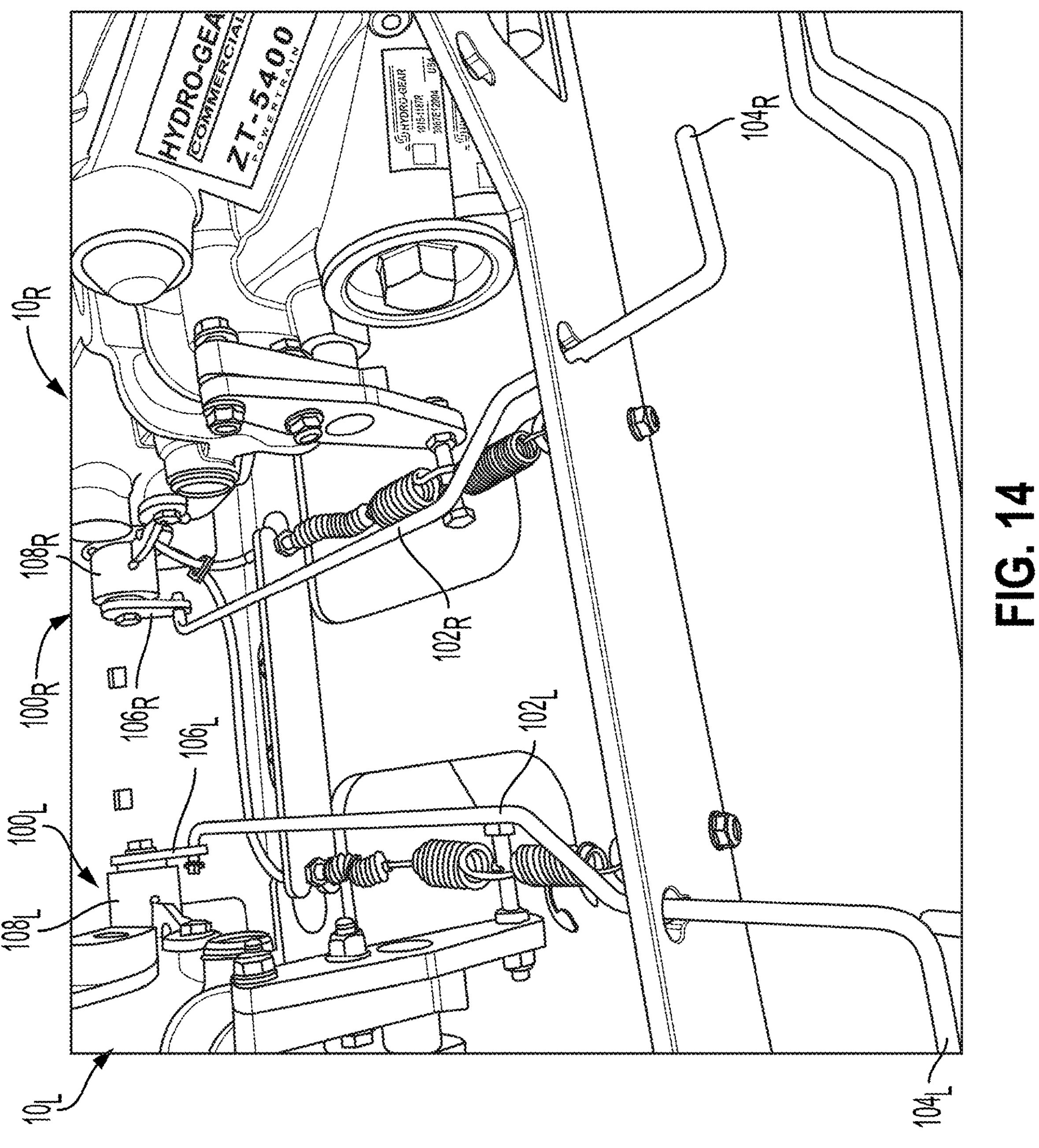
FIG. 14 shows a rear perspective view of a power equipment apparatus comprising the first embodiment of the valve actuator and the second embodiment of the valve actuator.

Referring to FIGS. 9, 10, and 14 shown are views of a structure 15 with both the left handed assembly of FIGS. 4 and 5 and the right handed assembly of FIGS. 6 and 7. It should be noted that in the embodiment shown, the valve actuator assemblies are largely mirror images of one another with the notable exception that the chirality of threading of fasteners need not be reversed. In the embodiment shown the bypass valves of the hydrostatic transmissions face toward one another.

Figure 17:
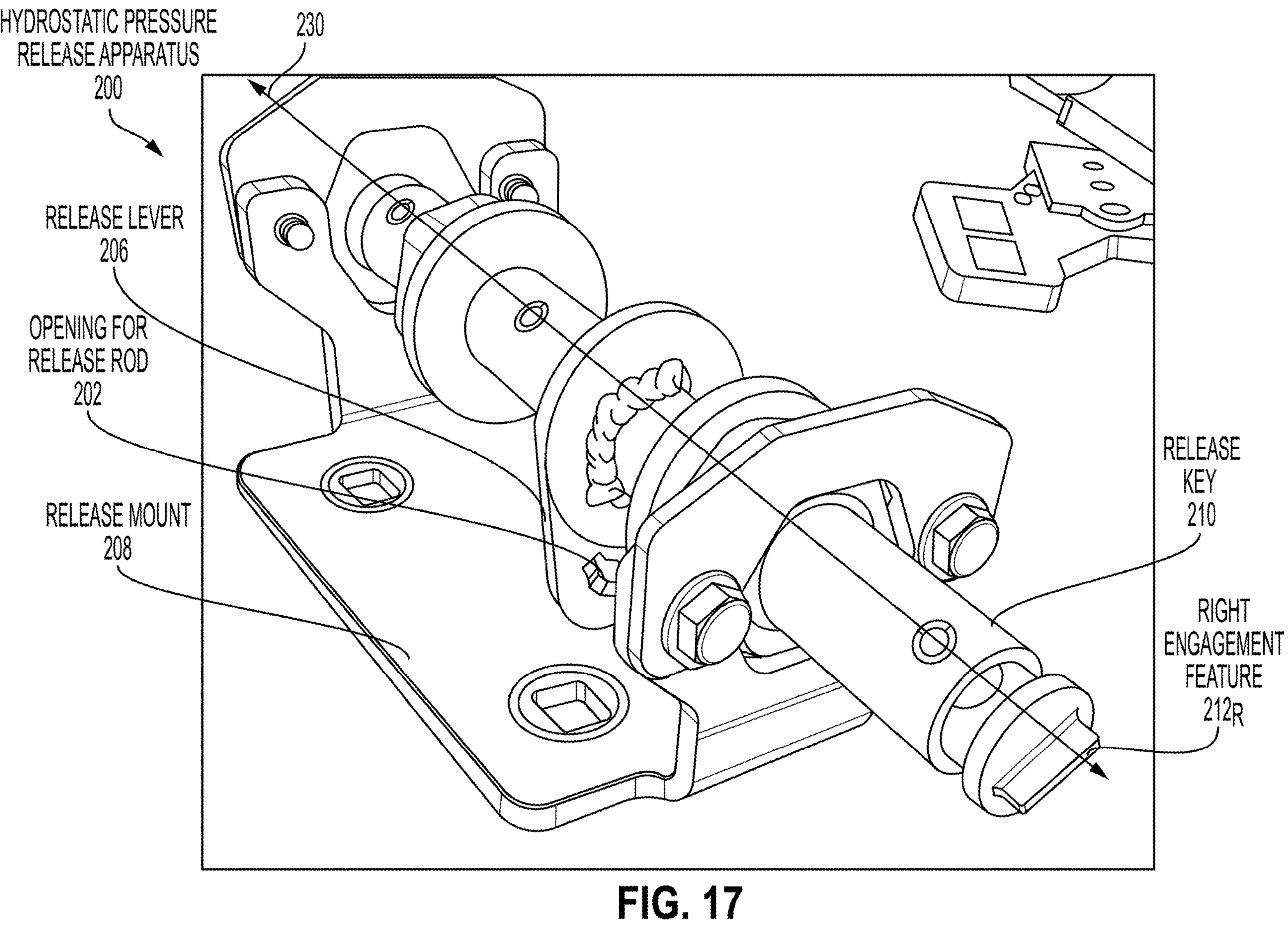
FIG. 17 shows a perspective view of a third embodiment of a valve actuator.
Figure 18:
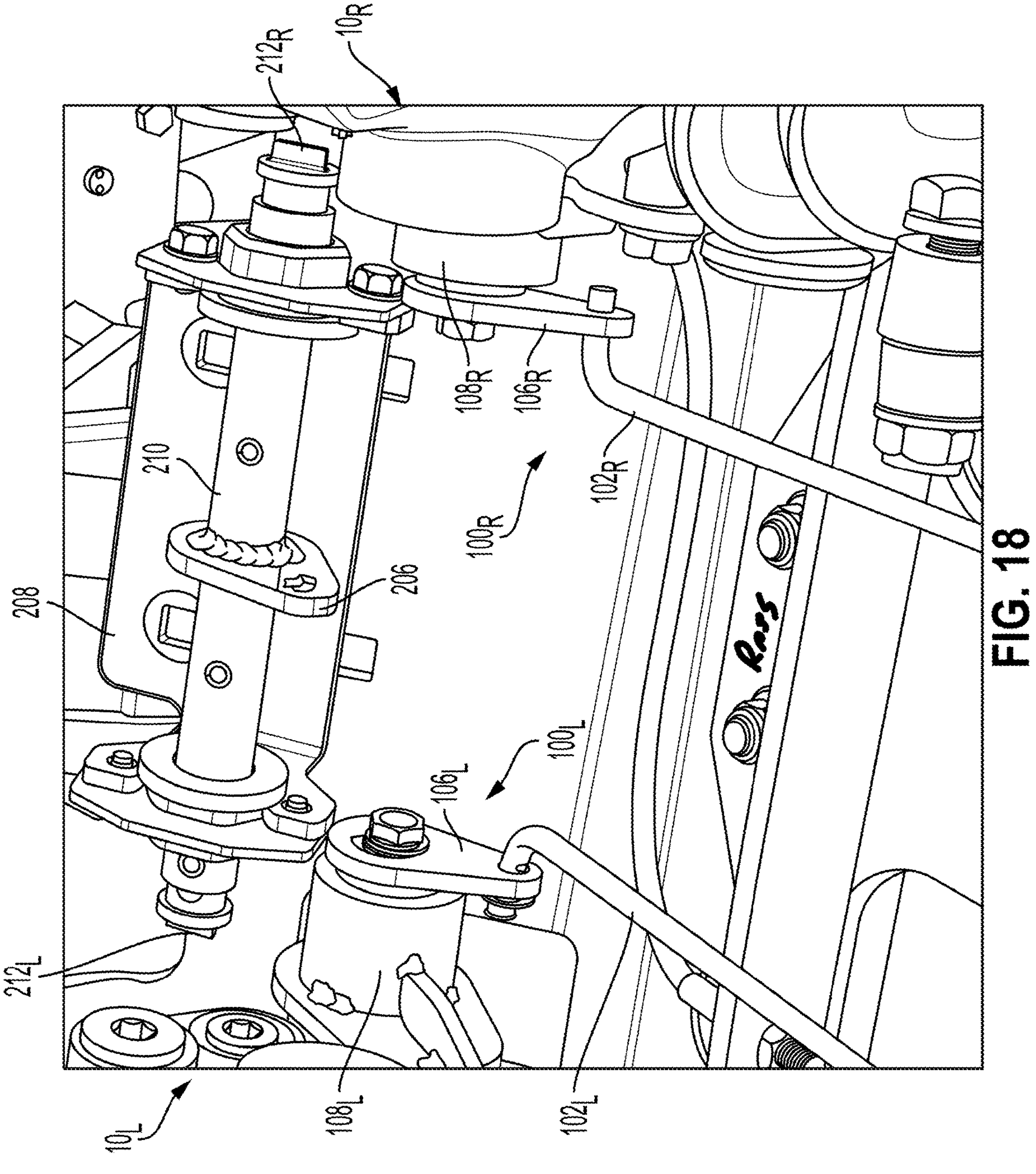
FIG. 18 shows a perspective view of a power equipment apparatus comprising the first embodiment of the valve actuator operationally engaged with a first embodiment of a hydrostatic transmission, the second embodiment of the valve actuator operationally engaged with a second embodiment of a hydrostatic transmission, and the third embodiment of the valve actuator positioned between the transmissions.
Figure 19:
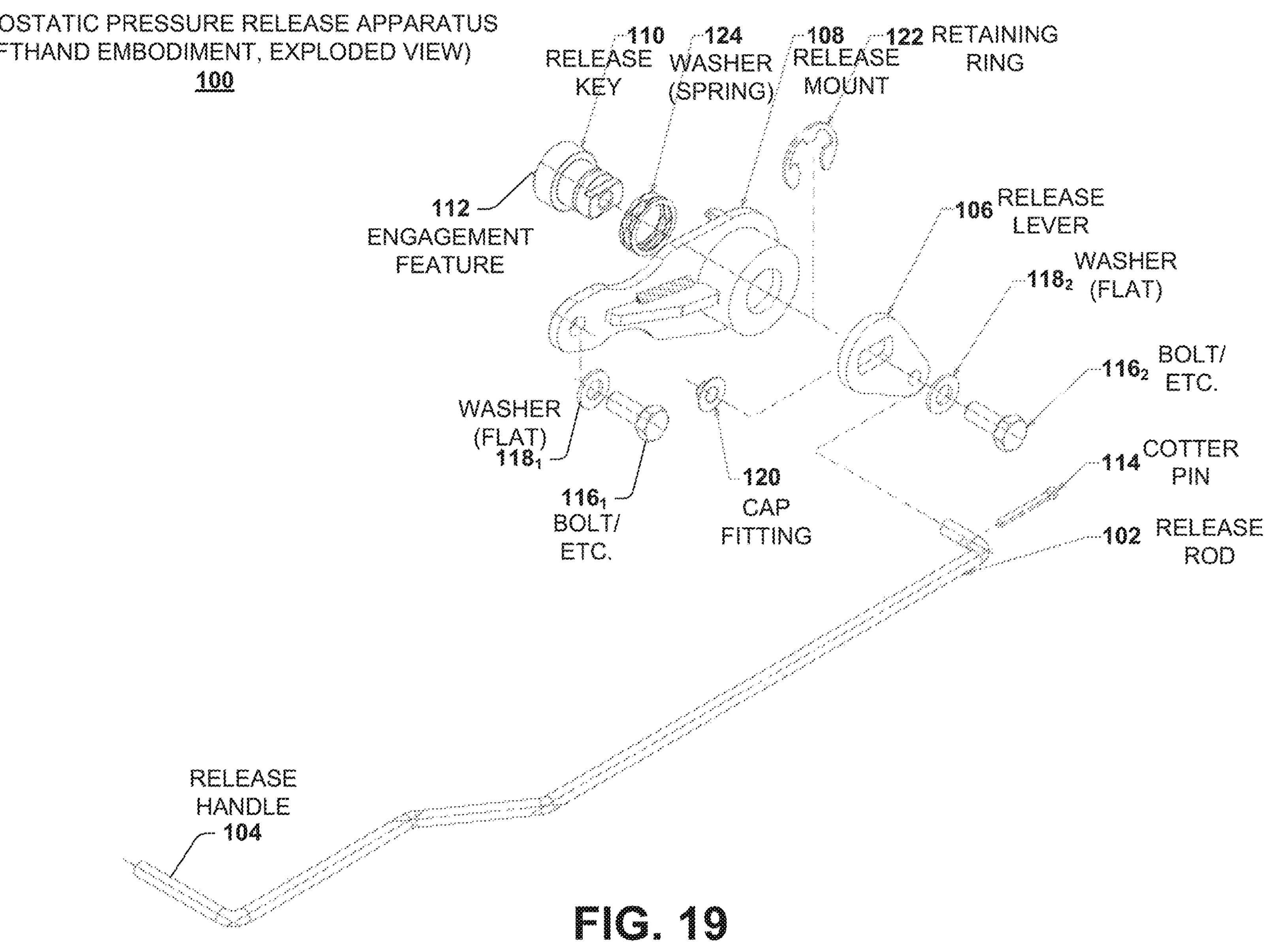
FIG. 19 shows an exploded view of a first embodiment of a valve actuator.

Referring now to FIGS. 17 and 18, shown is an alternative embodiment of a valve actuator 200 adapted for engagement with bypass valves of hydrostatic transmissions that face toward one another as referenced above. Valve actuator 200 has a release key 210, elongated along actuation axis 230, the release key 210 having at each end thereof an engagement feature 212 such that there is a right hand engagement feature $\mathbf{212}_R$ and left hand engagement feature $\mathbf{212}_L$. Referring now to FIG. 18, the release key is of such a length that the right hand engagement feature $\mathbf{212}_R$ may be operationally engaged with the bypass valve of the right hand hydrostatic transmission while simultaneously the left hand engagement feature $\mathbf{212}_L$ may be operationally engaged with the bypass valve of the left hand hydrostatic transmission. The release key 210 may be rotatably engaged with a release mount 208 adapted to retain the release key in position while still permitting it to rotate about the actuation axis. The release mount may be a bracket adapted for fixed engagement with the left hand hydrostatic transmission, or the right hand hydrostatic transmission, or both. A release lever 206 may be operationally engaged with the release key 210 to apply an operational torque to the release key sufficient to move both engaged bypass valves between their drive and bypass positions. As with the first embodiment of a release lever 106, the second embodiment of a release lever has an offset engagement location for operational engagement with a release rod 202.

It should be understood that the present subject matter further contemplates actuation of the release key by other means such as automated means.

In regard to the various functions performed by the above described components, machines, devices, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as electronic hardware configured to implement the functions, or a computer-readable medium having computer-executable instructions for performing the acts or events of the various processes.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

As used in this application, the term "or" is intended to mean an inclusive "or" rather than an exclusive "or", so that usage of "or" can have the same meaning as "and/or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In other embodiments, combinations or sub-combinations of the above disclosed embodiments can be advantageously made. Moreover, embodiments described in a particular drawing or group of drawings should not be limited to those illustrations. Rather, any suitable combination or subset of elements from one drawing(s) can be applied to other embodiments in other drawings where suitable to one of ordinary skill in the art to accomplish objectives disclosed herein, known in the art, or reasonably conveyed to one of ordinary skill in the art by way of the context provided in this specification. Where utilized, block diagrams of the disclosed embodiments or flow charts are grouped for ease of understanding. However, it should be understood that combinations of blocks, additions of new blocks, re-arrangement of blocks, and the like are contemplated in alternative embodiments of the present disclosure.

Based on the foregoing it should be understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A valve actuator comprising a release key elongated along an actuation axis and adapted to rotate about the actuation axis, the release key having an engagement feature adapted for operational engagement with an associated bypass valve of an associated hydrostatic transmission, a cylindrical exterior surface, a release key shoulder, and a release key stem having a flat thereon;

a release mount defining a cylindrical interior surface mated to the cylindrical exterior surface and coaxial with the actuation axis, the release mount adapted to retain the release key in operational engagement with the associated bypass valve of the associated hydrostatic transmission while permitting the release key to rotate about the actuation axis;

a spring operationally engaged between the release key shoulder and the release mount and adapted to bias the release key away from the release mount;

a release lever elongated to define a first lever axis and second lever axis parallel to and offset from the first lever axis by a release lever operational length, and operationally engaged with the flat and operable to apply operational torque to the release key such that the first lever axis is coaxial with the actuation axis; and a release rod operationally engaged with the release lever at the second lever axis.

2. The valve actuator of claim 1, wherein the release key stem further comprises a connection feature; and the actuator further comprises a retaining ring operationally engaged with the connection feature to retain the release key within the release mount.

3. The valve actuator of claim 1, wherein the release key stem further comprises a hole; and the actuator further comprises a bolt operationally engaged with the hole to retain the release lever to the release key stem.

4. The valve actuator of claim 1, wherein the release key stem extends through the release mount.

5. The valve actuator of claim 1, wherein the release mount is adapted to locate directly on the associated hydrostatic transmission and to be secured thereto.

6. A method of adjusting a bypass valve of a hydrostatic transmission, comprising:

providing a valve actuator comprising a release key elongated along an actuation axis and adapted to rotate about the actuation axis, the release key having an engagement feature adapted for operational engagement with the bypass valve of the hydrostatic transmission, a cylindrical exterior surface, a release key shoulder, and a release key stem having a flat thereon, a release mount defining a cylindrical interior surface mated to the cylindrical exterior surface and coaxial with the actuation axis, the release mount adapted to retain the release key in operational engagement with the bypass valve of the hydrostatic transmission while permitting the release key to rotate about the actuation axis, a spring operationally engaged between the release key shoulder and the release mount and adapted to bias the release key away from the release mount, a release lever elongated to define a first lever axis and second lever axis parallel to and offset from the first lever axis by a release lever operational length, and operationally engaged with the flat and operable to apply operational torque to the release key such that the first lever axis is coaxial with the actuation axis, and a release rod operationally engaged with the release lever at the second lever axis;

operationally engaging the engagement feature with the bypass valve of the hydrostatic transmission; and using the release rod to adjust the release lever to apply operational torque to the release key to adjust the bypass valve.

7. The method of adjusting a bypass valve of a hydrostatic transmission of claim 1, wherein the release key stem further comprises a connection feature; and the actuator further comprises a retaining ring operationally engaged with the connection feature to retain the release key within the release mount.

8. The method of adjusting a bypass valve of a hydrostatic transmission of claim 1, wherein the release key stem further comprises a hole; and the actuator further comprises a bolt operationally engaged with the hole to retain the release lever to the release key stem.

9. The method of adjusting a bypass valve of a hydrostatic transmission of claim 1, wherein the release key stem extends through the release mount.

10. The method of adjusting a bypass valve of a hydrostatic transmission of claim 6, further comprising: locating the release mount directly on the hydrostatic transmission; and securing the release mount to the hydrostatic transmission.

11. A set of hydrostatic transmissions with a valve actuator comprising:

a right hydrostatic transmission having a right bypass valve;

a left hydrostatic transmission having a left bypass valve;

a release key elongated along an actuation axis and adapted to rotate about the actuation axis, the release key having a right engagement feature operationally engaged with the right bypass valve and fixed to the release key to rotate therewith, the right engagement feature having a right cylindrical exterior surface, a right release key shoulder, and a right release key stem, and a left engagement feature operationally engaged with the left bypass valve and fixed to the release key to rotate therewith, the left engagement feature having a left cylindrical exterior surface, a left release key shoulder, and a left release key stem;

a right release mount defining a right cylindrical interior surface mated to the right cylindrical exterior surface and coaxial with the actuation axis;

a left release mount defining a left cylindrical interior surface mated to the left cylindrical exterior surface and coaxial with the actuation axis;

a release lever elongated to define a first lever axis and second lever axis parallel to and offset from the first lever axis by a release lever operational length, and operationally engaged with the release key and operable to apply operational torque to the release key such that the first lever axis is coaxial with the actuation axis; and a release rod operationally engaged with the release lever at the second lever axis.

12. The set of hydrostatic transmissions with a valve actuator of claim 6, wherein the release lever is adapted to rotate the right engagement feature and the left engagement features simultaneously.

* * * * *